United States Patent [19]
Hübner

[11] 3,887,862
[45] June 3, 1975

[54] AUXILIARY EXTINGUISHING ARRANGEMENT FOR THE INVERTERS IN AN INTERMEDIATE LINK CONVERTER

[75] Inventor: Klaus Hübner, Erlangen, Germany

[73] Assignee: Siemens Aktiengesellschaft, Munich, Germany

[22] Filed: Sept. 20, 1973

[21] Appl. No.: 399,348

[30] Foreign Application Priority Data
Sept. 22, 1972 Germany............................ 2246562

[52] U.S. Cl................ 321/45 C; 318/138; 318/227; 321/4
[51] Int. Cl. ............................................. H02m 5/44
[58] Field of Search............. 321/45 C, 4, 5, 11–14; 318/138, 227, 254

[56] References Cited
UNITED STATES PATENTS

| | | | |
|---|---|---|---|
| 3,474,320 | 10/1969 | Chandler........................... | 321/45 C |
| 3,568,021 | 3/1971 | Turnbull ...................... | 321/45 C X |
| 3,612,973 | 10/1971 | Kuniyoshi ......................... | 321/45 C |
| 3,621,366 | 11/1971 | Duff et al......................... | 321/45 C |
| 3,652,874 | 3/1972 | Partridge........................... | 321/45 C |
| 3,663,942 | 5/1972 | Jakobsen....................... | 321/45 C X |
| 3,683,264 | 8/1972 | Schieman.............................. | 321/14 |
| 3,694,730 | 9/1972 | Hoft et al....................... | 321/45 C X |
| 3,757,140 | 9/1973 | Gurwicz et al................ | 321/45 C X |
| 3,757,197 | 9/1973 | Bailey .............................. | 321/45 C |

FOREIGN PATENTS OR APPLICATIONS
1,063,733  3/1967  United Kingdom............... 321/45 C Primary Examiner—William H. Beha, Jr.
Attorney, Agent, or Firm—Kenyon & Kenyon Reilly Carr & Chapin

[57] ABSTRACT

An improved auxiliary extinguishing arrangement for extinguishing the inverters in an intermediate link converter of the type having an impressed current and supplying an electric motor in which the output terminals of the intermediate link are bridged by a series circuit comprising a controlled and uncontrolled rectifier and a reversing choke with a commutation capacitor in parallel with the controlled rectifier and reversing choke thereby permitting effluence commutation at low speeds with a minimum number of components.

4 Claims, 2 Drawing Figures

3,887,862

AUXILIARY EXTINGUISHING ARRANGEMENT FOR THE INVERTERS IN AN INTERMEDIATE LINK CONVERTER

BACKGROUND OF THE INVENTION

This invention relates to electric motors in general and more particularly to such motors which are fed by an intermediate link converter. Intermediate link converter motors of this type are well known in the art. For example, one such arrangement is shown in Brown Bovery Mitt. vol 54, No. 5/6, pp. 217–224 [1967]. A type of converter motor is also shown in Siemens Zeitschrift vol 45, No. 10, pp. 753–757, [1971]. As with most converter motors this is a rotating machine of synchronous design. Generally converter motors are of this nature and are supplied from a single or three phase constant voltage and frequency through a controlled rectifier, an intermediate DC link and an inverter. The inverter is controlled in response to the load and the reactive power for commutation supplied by the machine itself.

In a converter motor, the reactive power needed for commutation of motor current can be provided by the motor itself only over a predetermined speed. In a speed range between zero and approximately 1/10 of the nominal speed of the motor a separate starting and commutation aid must be provided to supplement the normal operation. Such an arrangement is shown for example in German Offenlegungsschrift 1,538,140 in which a multiphase machine having a Y connected stator winding is supplied through an intermediate link with an impressed voltage. The auxiliary extinguishing arrangement shown therein comprises two series connected controlled rectifiers which bridge the output terminals of the intermediate link and between whose junction point and the neutral point of the stator winding a commutation capacitor is connected. Through this auxiliary extinguishing arrangement, the devices in the inverter, which typically will be thyristors, and therefore the motor current, may be extinguished in synchronism with signals from a rotor position transmitter.

Such an auxiliary extinguishing arrangement for the inverter devices must be able to function independently of the short circuit power of the supply system where a commutation time as short as possible is desired in order to avoid major dips in torque at the motor shaft. Such an extinguishing arrangement should also operate properly under no load conditions. That is, its function must also be maintained during intermittent load current. Another object in such a device is to obtain such operation with a minimum number of controlled rectifiers, which devices add considerably to the overall expense.

Present arrangements only partially satisfy these requirements. For example in Siemens Zeitschrift vo. 45 No. 4, p.p. 195–197 [1971] a converter with impressed current in the intermediate link and in which a three phase commutation arrangement is provided to supply an asynchronous machine is shown. Since the later cannot supply reactive power for commutation of the inverter over its entire speed range, a commutation aid must be provided with this type of arrangement. In German Offenlegungsschrift 1,413,481 an intermediate link converter with impressed DC voltage in the intermediate link is shown. In this arrangement the rectifiers of the inverter are shunted by reactive current diodes. This inverter can also be used to supply an asynchronous machine or as a reversible drive with a DC motor. In this converter the output of the intermediate link is bridged by a series circuit comprising a controlled and an uncontrolled rectifier and an inductance, with a series resonant circuit connected parallel to the controlled rectifier and a quenching capacitor parallel to the controlled rectifier and the inductance. Commutation is initiated by firing the controlled rectifier in the series circuit. Since the quenching capacitor is charged only slightly negative during the commutation process, the parallel connected series resonant circuit is required in this arrangement for extinguishing the controlled rectifier. The controlled rectifier in the circuit must also be designed for very large loads particularly if the arrangement is used to perform speed control. In addition the frequency limit of such a drive is quite low.

Thus it can be seen that there is a need for an improved arrangement of this nature which permits commutation of motor current at low speeds and uses a minimum number of components to reduce the cost of the converter arrangement.

SUMMARY OF THE INVENTION

The present invention provides such a system. The intermediate link converter is designed for impressed current and a series connected circuit comprising a controlled rectifier and an uncontrolled rectifier and a reversing choke are placed across the output of the DC link with the commutation capacitor placed across the controlled rectifier and reversing choke. In the preferred embodiment the voltage appearing at the commutation capacitor is detected using a voltage detector which is coupled to the firing device for the rectifiers in the inverter so that the detector will block the firing of pulses when the commutation capacitor voltage falls below a predetermined limit. In the auxiliary extinguishing arrangement of the present invention the current in the two current carrying windings of the motor is made zero in the inverter at the beginning of each commutation. This permits a new group of converters to be connected in a subsequent brief interval. The arrangement of the present invention works well independently of the short circuit power of the supply system. Very short commutation times are obtained resulting in only slight dips in torque. The arrangement functions well under no load conditions, i.e., it is fully operable with intermittent DC current. In addition only a few additional components are required since only one additional controlled rectifier and no separate voltage source for the initial charging and subsequent charging are required. No separate quenching circuit is required for the controlled rectifier of the auxiliary extinguishing arrangement and thus this rectifier does not need to be designed for particularly high current loads.

DETAILED DESCRIPTION OF THE PREFERRED EMBODIMENT

Figure 1:
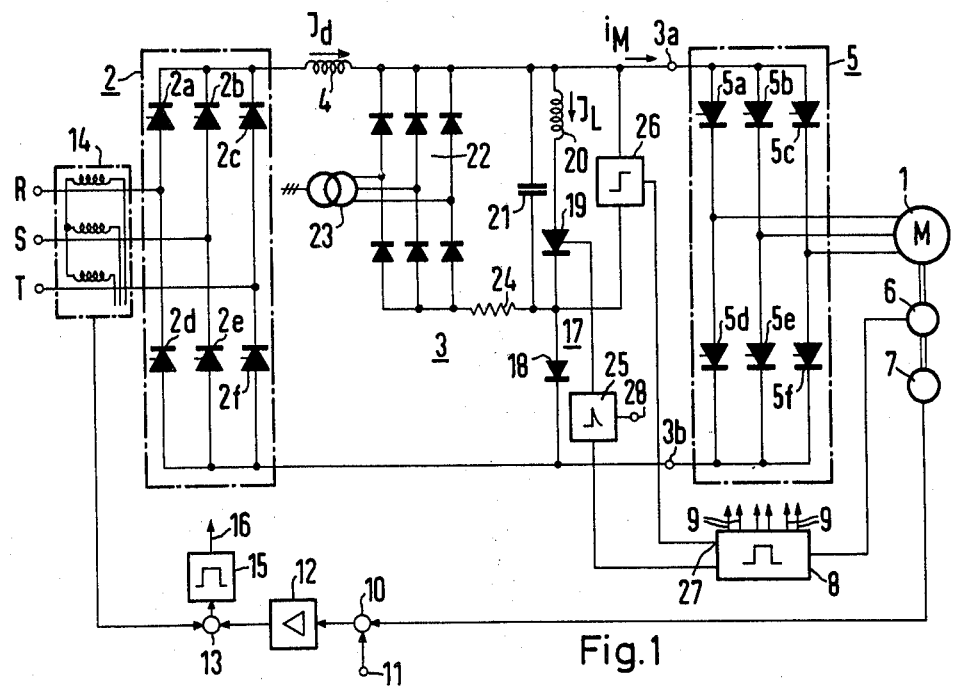
FIG. 1 is a circuit diagram of the arrangement of the present invention.

FIG. 1 illustrates a converter motor 1 having installed the auxiliary extinguishing arrangement of the present invention. In conventional fashion, the motor 1 is supplied from a three phase system, with the phases designated R, S and T, through a controlled rectifier 2, a DC link 3 and a controlled interter 5. In the illustrated embodiment the controlled rectifier comprises six controlled rectifiers arranged in a three phase bridge circuit. The rectifiers 2a through 2f preferably will be thyristors. Similarly the controlled inverter also comprises six controlled rectifiers 5a through 5f connected in a three phase bridge circuit. These also will preferably be thyristors. No further semi-conductor components such as reactive current diodes need be provided in the present arrangement, since the converter operates with impressed current in the intermediate link. In the DC link 3 a smoothing inductance 4 is provided in conventional fashion.

Coupled to the rotor of motor 1 is a rotor position transmitter 6 which may be of the premanent magnet type or may be one equipped with Hall effect generators. Also coupled thereto is a conventional tachometer generator 7. Signals from the rotor position transmitter 6 are fed to a logic circuit 8 wherein they are decoded in conventional fashion to provide outputs on lines 9 for the firing of the inverter thyristors 5a through 5f. Such arrangements are well known and are disclosed for example in German Pat. No. 1,240,980. The signals for the tachometer generator 7 are provided to a summing junction 10 where they are compared with a signal provided at an input 11, which signal is indicative of a desired speed. The error signal is provided through a speed control amplifier 12 to a second summing junction 13 wherein the signal is compared with an input taken from a current transformer 14 which measures the input current to the controlled rectifier 2. In response thereto a current control arrangement 15 provides outputs on line 16 to properly fire the thyristors 2a through 2f in the controlled rectifier 2 to maintain the proper amount of current flowing in the motor. Such arrangements are similarly well known in the art and will not be described in detail herein.

The output terminals 3a and 3b of the intermediate DC link 3 having the impressed current thereon are bridged by a series circuit designated generally as 17. This circuit comprises an uncontrolled rectifier 18, a controlled rectifier 19 and a reversing choke 20. The reversing choke 20 is coupled to the controlled rectifier 19 and this series arrangement is shunted by a commutation capacitor 21. The series circuit 17 and the commutation capacitor 21 are the essential components of the auxiliary extinguishing arrangement in which the machine windings act as the commutation inductances. The uncontrolled rectifier 18 may be, for example, a diode which acts as a decoupling diode and the controlled rectifier 19 a thyristor, which thyristor is generally designated a quenching thyristor.

A rectifier 22 which comprises six uncontrolled rectifiers or diodes arranged in a three phase bridge circuit is provided for the charging of commutation capacitor 21. The input of the rectifier 22 is coupled to the three phase line through a transformer 23 in order to step down the voltage of the desired level. The rectifier output is coupled to the capacitor 21 through a resistor 24 and charges the capacitor 21 in a manner to be described in detail below.

Firing of the controlled rectifier 19 is accomplished through the use of a differentiating circuit 25. Differentiating circuit 25 is connected to the logic circuit 8 and will receive an input pulse each time an output pulse is provided on one of the lines 9 indicating that one of the controlled rectifiers 5a through 5f is to fire. Also included is a voltage detector 26 which may be used for detecting the voltage $u_c$ present at the capacitor 21. This voltage detector may for example be a Zenner diode having a breakdown voltage $u_{c1}$. The output of the voltage detector is coupled to the blocking input 27 of the logic circuit 8. Preferably an opto-electric coupling element such as a light gate will be used for this connection in order to provide potential separation and to obtain transmission of the static DC signal without delay. The operation of this circuit will be discussed in more detail below.

At operating speeds which are above 1/10 the nominal speed $n_N$, the motor current $i_M$ is commutated in the converter motor of FIG. 1, for example, from thyristor 5a to the thyristor 5b by means of the machine voltage of the synchronous machine 1. For operating speeds which are lower than 1/10 of the nominal speed, the machine voltage is not sufficient for commutation. This requires the motor current $i_M$ be made zero in the rhythm of the commutation frequency through the use of the auxiliary extinguishing arrangement. To understand the exact manner in which this is accomplished through the circuit of the present invention reference should be had to FIG. 2. On FIG. 2, the voltage at capacitor 21 and designated $u_c$, the current $i_L$ in the reversing choke 20, the motor $i_M$, the output voltage $u_G$ of the voltage detector 26 and the firing pulse Z for the quenching thyristor 19 are plotted versus time $t$.

Figure 2:
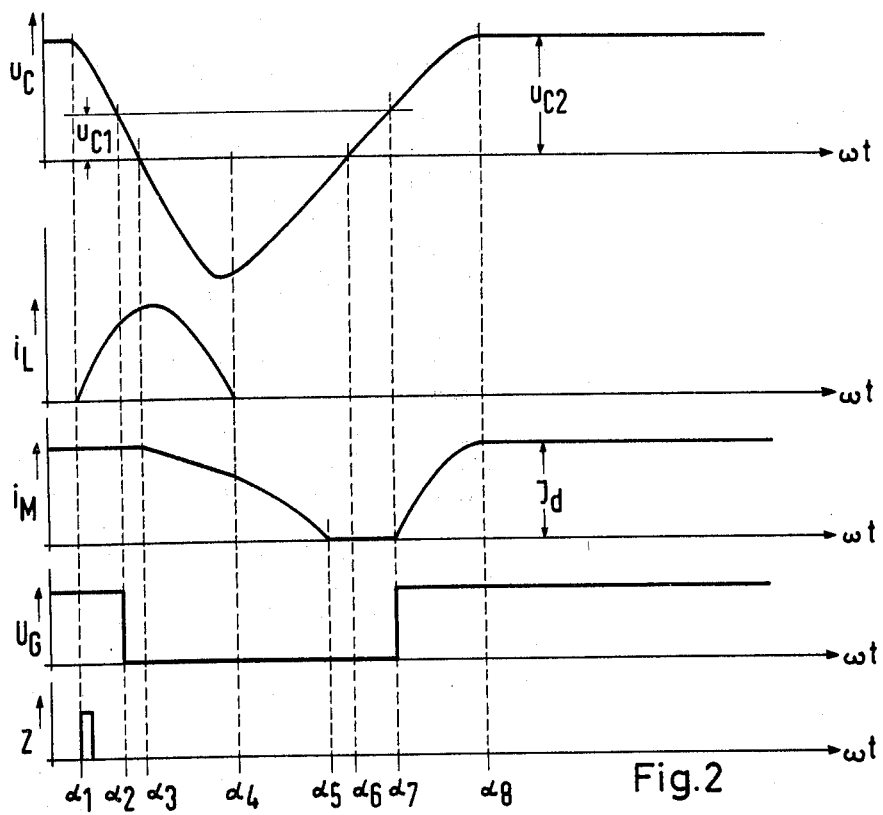
FIG. 2 is a wave-form diagram helpful in understanding the operation of the circuit of FIG. 1.

Assume that the thyristors 5a and 5f are carrying current and that the motor current $i_M$ is to be commutated from thyristor 5a to 5b and that the capacitor 21 is charged to the polarity indicated on FIG. 2. Also assume that the speed is between zero and 1/10 of nominal speed, the range in which the circuit of the present invention works. The commutation process will now be described. In response to outputs from the position transmitter 6 a firing pulse for thyristor 5b is provided on one of the lines 9. This occurs at the time $\alpha 1$ as indicated on FIG. 2. This output is also provided from the logic circuit 8 to the differentiator 25 resulting in a firing pulse Z being provided to the quenching thyristor 19. With the thyristor 19 ignited, the commutation capacitor 21 discharges through the reversing choke 20 and the thyristor 19. At the point where the voltage at the capacitor reaches the voltage $u_{c1}$, the threshold voltage of the voltage detector 21, indicated at the time $\alpha 2$ on FIG. 2, the output voltage of $u_G$ of the voltage detector changes as illustrated. This voltage is provided as an input on line 27 to the logic circuit 8 and acts to disable any firing pulses from being provided out of the logic circuit. Since the controlled rectifier 5b to which the current was to be commutated has not yet been able to carry current, it reverts to the nonconducting state at this point. At the time $\alpha 3$, $u_c$ is equal to zero and the reversing current $i_L$ is at its maximum. The capacitor voltage now becomes negative causing current to be driven through the diode 18 against the direction of conduction of the rectifiers 5a and 5f resulting in a decrease in the motor current $i_M$.

At the time $\alpha 4$ the reversing current $i_L$ is equal to zero resulting in the thyristor 19 being extinguished without any further measures. Negative capacitor voltage $u_c$ causes the motor current $i_M$ to decrease towards zero until at time $\alpha 5$ the current carrying rectifiers 5a and 5f of inverter 5 are extinguished. The intermediate link current $i_d$ now causes the charge of capacitor 21 to be reversed and become more positive. At $\alpha 6$ the capacitor voltage $u_c$ again reaches zero. The time $T=1/\omega$ ($\alpha 6 - \alpha 5$) must be at least equal to the recovery time of the thyristors of the inverter 5. Normally, commutation of the machine current $i_M$ to the newly ignited rectifiers 5b and 5f of the inverter could begin any time from $\alpha 6$ on. However, since $u_c$ has not yet reached the value $u_{c1}$ i.e., the threshold value of the voltage detector 26, the capacitor 21 continues to be charged by the current $i_d$ until that voltage is reached at time $\alpha 7$. At this point the voltage $u_G$ again changes and enables the logic circuit to begin outputing firing pulses. As the motor current $i_M$ slowly increases until time $\alpha 8$, capacitor 21 continues to charge until at that time it reaches the voltage $u_{c2}$. This permits it to have sufficient voltage of the proper polarity as is required for the next commutation.

The delayed release of the firing pulses of inverter 5 results in the final positive voltage $u_{c2}$ being higher than that resulting from the commutation process itself. This voltage may be expressed as follows:

$$u_{c2} = \sqrt{u^2c1 + [L_M / C] i_M^2}$$

where $L_M$ is the stray inductance of the motor involved in the commutation process. Through the use of the voltage detector 26, the capacitor voltage $u_{c1}$ is selected so that the loses of the reversing process, lasting from the time $\alpha 1$ to the time $\alpha 2$ are supplied and also so that a voltage $u_{c2}$ is obtained allowing a current considerably larger than that of the preceding commutation to be commutated if necessary. Through these measures, recharging of the capacitor 21 from the voltage source is not required. The auxiliary voltage source comprising the rectifier bridge 22 and transformer 23 and which applies a voltage $u_H$ to the capacitor 21 through the resistor 24 is required only to provide for the leakage losses of the capacitor and the internal consumption of the detector 26 and thus can be designed having relatively low power. The initial charging of the capacitor 21 during start up similarly takes place through the intermediate link 3, since no current can flow in the inverter 5 until the voltage value $u_{c1}$ is reached at the commutation capacitor 21.

Safe operation of the inverter with intermittent load current is insured through the use of voltage detector 26. Even if the current $i_d$ on the intermediate link 3 is intermittent during commutation, for example due to a control action at the control circuits 12 or 15 of the rectifier bridge, and the charge reversal of the commutation capacitor 21 toward a positive voltage is interrupted, the output of the logic circuit 8 to the thyristors through 5f remains blocked until the voltage $u_{c1}$ is reached. Only after this limit is exceeded does the voltage detector 26 change its output to permit firing signals to the rectifiers of the inverter 5.

The entire auxiliary extinguishing arrangement can be disabled in a simple manner when the minimum speed required for machine controlled commutation, i.e., approximately 10% of nominal speed, is reached. All that is required is that the differentiator 25 be disabled. For this purpose an input 28 is provided.

Thus an improved auxiliary extinguishing arrangement for a converter fed motor has been shown. A starting aid is provided which insures reliable commutation of the motor current in very low speed ranges and requires a minimum number of components. The arrangement of the present invention is not only suitable as a starting circuit for converter motors of the type illustrated but may also be used in any converter having an intermediate current link regardless of the type of machine. For example this arrangement may be used with an asynchronous three phase machine. These and other modifications may be made without departing from the spirit of the invention which is intended to be limited solely by the appended claims.

What is claimed is:

1. An auxiliary extinguishing arrangement for the rectifier devices of an intermediate link converter supplying an electric motor, said intermediate link converter including a logic circuit for controlling the firing of the rectifier devices, where the improvement comprises:
   a. a series circuit including a reversing choke, a controlled rectifier and an un-controlled rectifier, placed across the output of the intermediate link;
   b. a commutation capacitor shunted across the series combination of the reversing choke and controlled rectifier;
   c. means for voltage detection having its input coupled to measure the voltage at said commutation capacitor and providing its output as a disabling input to the logic circuit, said voltage detection means providing a disabling output during each commutation when the voltage at said commutation capacitor falls below a predetermined limit.

2. The invention according to claim 1 wherein a differentiating circuit is provided, said differentiating circuit obtaining an input from said logic circuit in response to rectifier firing commands and providing its output as a firing command for said controlled rectifier.

3. The invention according to claim 2 and further including an auxiliary voltage supply for charging said commutation capacitor.

4. The invention according to claim 3 wherein said auxiliary voltage supply comprises a transformer and a rectifier bridge circuit and further including a resistor coupling the output of said bridge to said capacitor.

* * * * *

UNITED STATES PATENT AND TRADEMARK OFFICE
CERTIFICATE OF CORRECTION

PATENT NO. : 3 887 862
DATED : June 3, 1975
INVENTOR(S) : Klaus Hübner

It is certified that error appears in the above-identified patent and that said Letters Patent are hereby corrected as shown below:

In the Abstract, line 9, change "permitting effluence commutation" to --permitting efficient commutation--

Signed and Sealed this twenty-fifth Day of November 1975

[SEAL]

Attest:

RUTH C. MASON
Attesting Officer

C. MARSHALL DANN
Commissioner of Patents and Trademarks